US009156624B2

(12) United States Patent
Farley et al.

(10) Patent No.: US 9,156,624 B2
(45) Date of Patent: Oct. 13, 2015

(54) GRAIN UNLOADING CONTROL SYSTEM

(75) Inventors: Herbert M. Farley, Elizabethtown, PA (US); Kevin W. Ward, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 508 days.

(21) Appl. No.: 13/270,685

(22) Filed: Oct. 11, 2011

(65) Prior Publication Data

US 2013/0089398 A1 Apr. 11, 2013

(51) Int. Cl.
*B65G 33/14* (2006.01)
*A01D 41/127* (2006.01)
*B60P 1/40* (2006.01)
*A01D 41/12* (2006.01)

(52) U.S. Cl.
CPC .............. *B65G 33/14* (2013.01); *A01D 41/127* (2013.01); *B60P 1/40* (2013.01); *A01D 41/1217* (2013.01)

(58) Field of Classification Search
CPC ........ B65G 33/14; B65G 37/00; B65G 47/18; B65G 33/24; B60P 1/40; A01D 61/00
USPC ......... 414/307, 315, 323, 325, 326, 327, 526, 414/528, 608; 198/608; 700/305, 306
See application file for complete search history.

(56) References Cited

U.S. PATENT DOCUMENTS

| 3,460,698 A | 8/1969 | Harris |
| 4,100,720 A | 7/1978 | Carnewal et al. |
| 4,274,790 A | 6/1981 | Barker |
| 4,572,356 A | 2/1986 | Janick |
| 4,583,905 A * | 4/1986 | Scherr .......................... 414/505 |
| 4,881,855 A | 11/1989 | Rempel et al. |
| 5,518,453 A | 5/1996 | Tribbett |
| 6,042,326 A | 3/2000 | Thomas et al. |
| 6,325,588 B1 | 12/2001 | Nolin |
| 6,743,093 B1 | 6/2004 | Pope et al. |
| 6,776,569 B1 | 8/2004 | McMahon et al. |
| 7,040,980 B1 | 5/2006 | Kestel |
| 7,452,180 B2 | 11/2008 | Talbi et al. |
| 7,461,737 B2 | 12/2008 | Dutschke |
| 2009/0290970 A1 | 11/2009 | Farley et al. |

\* cited by examiner

*Primary Examiner* — Saul Rodriguez
*Assistant Examiner* — Ashley Romano
(74) *Attorney, Agent, or Firm* — Patrick M. Sheldrake; Seyed V. Sharifi T.

(57) ABSTRACT

An agricultural device for controlled unloading of grain including an unloader conveyor including an enclosed housing having an inlet end including an opening for receiving grain, and an opposite outlet end including a discharge opening through which the grain can be discharged. An unloader conveyor element extends through the housing between the ends and operable for conveying the grain through the housing from the inlet end and discharging the grain through the discharge opening. The unloader conveyor element includes a substantially vertical unloader conveyor segment connected to a substantially horizontal unloader conveyor segment. An unloader drive selectably operates a portion of the conveyor element associated with the substantially vertical unloader conveyor segment in a disengaged mode in response to a sensed cumulative loading condition of the substantially vertical unloader conveyor segment and the substantially horizontal unloader conveyor segment exceeding a predetermined value.

20 Claims, 6 Drawing Sheets

GRAIN UNLOADING CONTROL SYSTEM

FIELD OF THE INVENTION

The present invention generally relates to control systems for agricultural devices and, more particularly, to grain unloading control systems for agricultural devices.

BACKGROUND

Grain tanks of combines commonly have an associated unloader conveyor operable for conveying grain from the grain tank to another location such as to a grain truck or wagon. An unloader conveyor typically includes an elongate, enclosed tubular housing containing a helical auger and is oriented horizontally or at a small acute angle to horizontal. The unloader conveyor is typically pivotally supported in cantilever relation by a lower end of an upstanding or vertical lower unloader conveyor section including an inlet opening disposed in or adjacent to the grain tank. The unloader conveyor is typically pivotable between a stored position extending along the combine, and a sidewardly extending unloading position. The unloader can be of any length, but will typically have a length sufficient to extend just beyond the end of a header of the combine. Grain tanks additionally typically include at least one grain tank conveyor including an auger adjacent to the bottom of the grain tank and extending into the inlet opening of the lower unloader conveyor for conveying grain into the unloader.

After use, if the unloader is not cleaned out, grain remaining in the unloader conveyor has been observed to have a tendency to settle in the enclosed lower region of the upstanding or vertical unloader conveyor section around the lower end of the auger therein and the adjacent end of the grain tank conveyor auger extending into the inlet opening. As a result, a problem that can occur if the grain tank and unloader augers are started simultaneously, or the grain tank auger is started first, is that the grain tank auger can force or pack the grain into and against the grain in the lower unloader housing, thereby causing grinding, cracking of and other damage to the grain. Also, if the augers are commonly driven and loaded with grain, the start up torque and power required will be higher than if the augers are started separately. As another problem or shortcoming, if the unloader conveyor is loaded with grain when pivoted between the sidewardly extending unloading position and the stored position, greater loads and stress are placed thereon and on the supporting structure thereof compared to if the unloader is empty. As the width of combine headers increase, it is anticipated that the length of unloader conveyors will necessarily also increase as will the amount and weight of grain remaining therein after use. As a result, the stress on the supporting structure when the unloader is in the unloading position and moving thereto and therefrom will also be increased. As still another possible problem, if the unloader auger should stall, for instance, due to a mechanical problem with the unloader drive, formation or induction of a slug of grain in the unloader tube, and the grain tank auger continues to operate, the inlet of the unloader can be packed with grain, which can result in excessive grain damage and/or damage to the grain tank auger.

Thus, what is sought is a grain tank unloader control system which overcomes many of the problems and shortcomings set forth above.

SUMMARY OF THE INVENTION

Other features and advantages of the present invention will be apparent from the following more detailed description of the preferred embodiment, taken in conjunction with the accompanying drawings which illustrate, by way of example, the principles of the invention.

The present invention relates to an agricultural device for controlled unloading of grain including an unloader conveyor including an enclosed housing having an inlet end including an opening for receiving grain, and an opposite outlet end including a discharge opening through which the grain can be discharged. An unloader conveyor element extends through the housing between the ends and is operable for conveying the grain through the housing from the inlet end and discharging the grain through the discharge opening. The unloader conveyor element has a substantially vertical unloader conveyor segment connected to a substantially horizontal unloader conveyor segment downstream of the substantially vertical unloader conveyor segment. An unloader drive is operably controllable for selectably operating the conveyor element between an engaged mode and a disengaged mode, including selectably operating a portion of the conveyor element associated with the substantially vertical unloader conveyor segment in a disengaged mode in response to a sensed cumulative loading condition of the substantially vertical unloader conveyor segment and the substantially horizontal unloader conveyor segment exceeding a predetermined value.

The present invention further relates to a kit for an agricultural device for controlled unloading of grain including an unloader conveyor. The agricultural device includes an enclosed housing having an inlet end including an opening for receiving grain, and an opposite outlet end including a discharge opening through which the grain can be discharged. The agricultural device further has an unloader conveyor element extending through the housing between the ends and operable for conveying the grain through the housing from the inlet end and discharging the grain through the discharge opening. The unloader conveyor element has a first substantially vertical unloader conveyor segment connected to a substantially horizontal unloader conveyor segment downstream of the substantially vertical unloader conveyor segment. The kit includes a second substantially vertical unloader conveyer segment configured to replace the first substantially vertical unloader conveyor segment of the unloader conveyor element. The kit includes a load sensing device. An unloader drive is operably controllable for selectably operating the conveyor element between an engaged mode and a disengaged mode in response to a loading condition sensed by the load sensing device. The unloader drive selectably operates a portion of the conveyor element associated with the second substantially vertical unloader conveyor segment in a disengaged mode in response to a sensed cumulative loading condition of the second substantially vertical unloader conveyor segment and the substantially horizontal unloader conveyor segment exceeding a predetermined value.

The present invention yet further relates to an agricultural device for controlled unloading of grain includes an unloader conveyor including an enclosed housing having an inlet end including an opening for receiving grain, and an opposite outlet end including a discharge opening through which the grain can be discharged. An unloader conveyor element extends through the housing between the ends and is operable for conveying the grain through the housing from the inlet end and discharging the grain through the discharge opening. The unloader conveyor element has a substantially vertical unloader conveyor segment connected to a substantially horizontal unloader conveyor segment downstream of the substantially vertical unloader conveyor segment. An unloader drive is operably controllable for selectably operating the conveyor element between an engaged mode and a disengaged mode, including selectably operating a portion of the conveyor element associated with the substantially vertical unloader conveyor segment in a disengaged mode in response to a cumulative loading condition of the substantially vertical unloader conveyor segment and the substantially horizontal unloader conveyor segment exceeding a predetermined torque value.

An advantage of the present invention is a grain unloading system that is configured to operate substantially continuously.

A further advantage of the present invention is a grain unloading system that is configured to operate without wasting grain associated with elevated start-up torque conditions.

Numerous other features and advantages of the present invention will become readily apparent from the following detailed description, the accompanying drawings, and the appended claims.

DETAILED DESCRIPTION OF THE PREFERRED EMBODIMENTS

Figure 1:
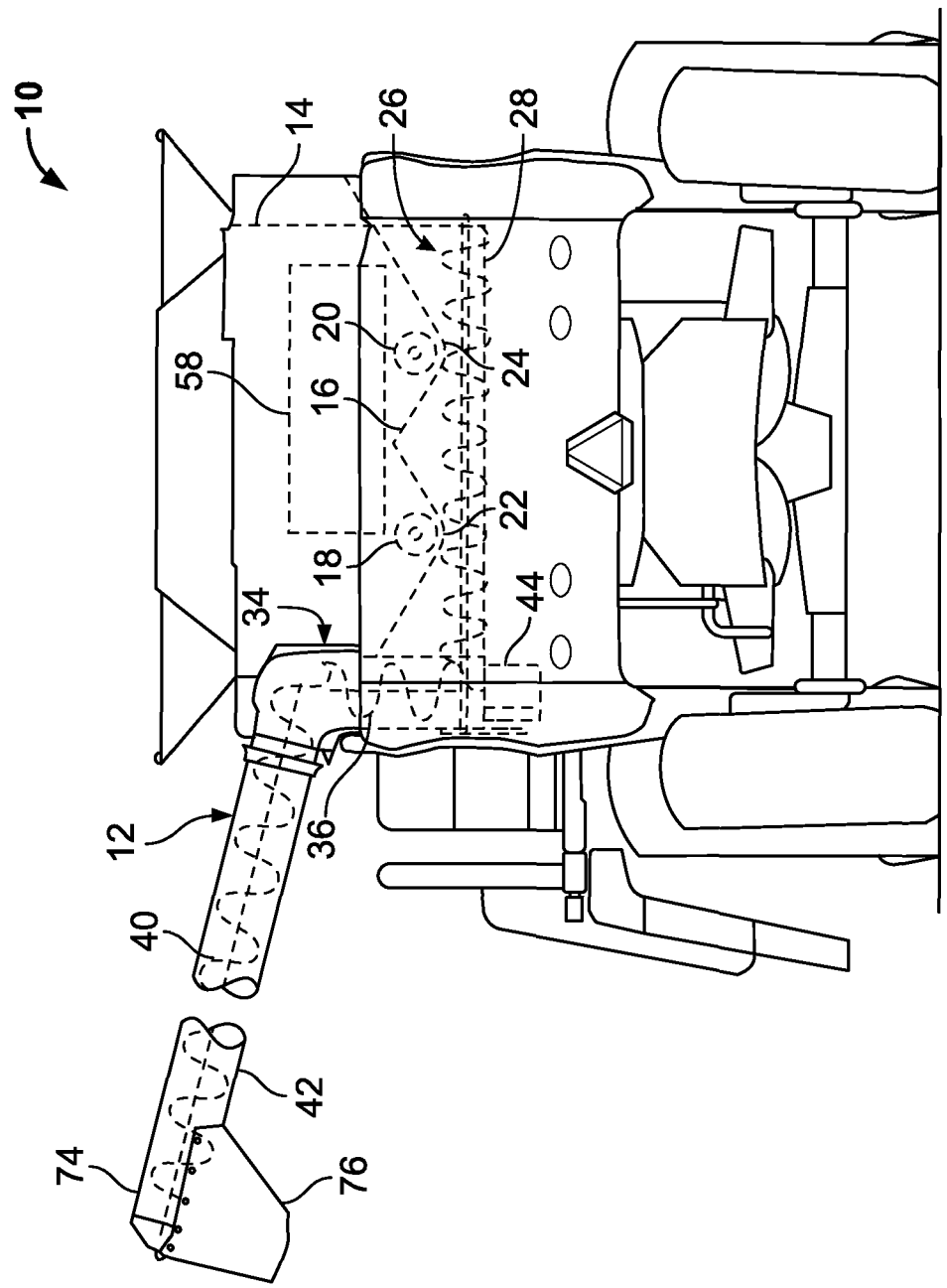
FIG. 1 is a simplified rear view of a representative agricultural harvesting device, including an unloader and an unloader control according to the invention for unloading grain from a grain tank of the device.

Referring now the drawings, in FIG. 1, a representative agricultural harvesting machine or device 10 is shown, including an unloader 12 operable for unloading grain from a grain tank located on an upper region of harvesting machine or device 10. Here, harvesting machine or device 10 is depicted as a well known, commercially available combine operable for harvesting a wide variety of grains, including, but not limited to, wheat, beans, corn, rice, and the like. Typically, the grain is harvested and threshed from stalks, pods, or other crop material, and conveyed away from a cleaning system of machine or device 10 by a clean grain conveyor to a grain elevator (not shown). The grain elevator then lifts the grain upwardly to a grain delivery conveyor which is operable for discharging the grain into grain tank 14 onto a floor 16 thereof. When grain tank 14 is filled with grain, or filled to a desired level, unloader 12 can be operated for unloading the grain from tank 14, onto the ground, or into a wagon, truck or other vehicle, or a bin or the like.

Figure 2:
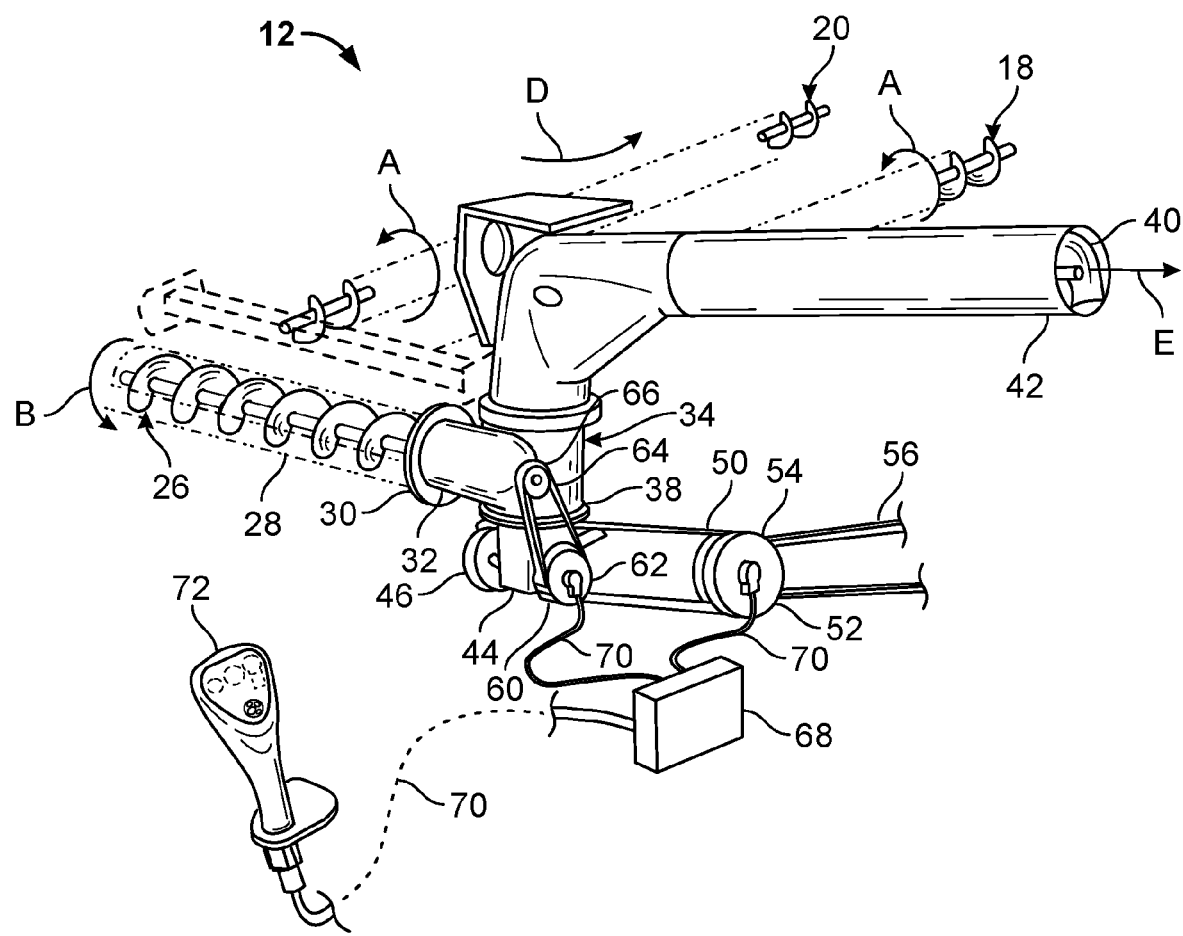
FIG. 2 is a simplified perspective view of the unloader of FIG. 1.

Referring also to FIG. 2, grain tank 14 may include a pair of grain tank conveyors 18 and 20 disposed in forward and rearwardly extending troughs 22 and 24 in floor 16 (FIG. 1). Grain tank conveyors 18 and 20 are each a generally horizontal elongate helical auger rotatable in a direction denoted by arrows A in FIG. 2 for instance, by being directly coupled, through a set of gearbox assemblies (not shown), to a main grain tank conveyer 26, or by a suitable drive or drives such as a belt, chain and/or shaft drive or a fluid or electric motor (not shown) for conveying grain through the respective trough 22 or 24 to a main grain tank conveyor 26. Main grain tank conveyor 26 comprises another generally horizontal elongate helical auger, located in a side to side extending trough 28 at the forward end of troughs 22 and 24 and grain tank 14. Here, it should be noted that the configuration of grain tank 14 shown is intended to be representative of a wide variety of grain tank configurations, and a grain tank can be configured differently, for instance, so as to have a floor which slopes down to directly to one or more main conveyors 26 (not shown) which feed to the unloader, thereby eliminating conveyors 18 and 20. It is to be understood that additional disclosure may be contained in Applicant's U.S. Pat. No. 7,452,180 titled Grain Tank Unloader And Clean Out Control, which is hereby incorporated by reference in its entirety. It is also to be understood that the present disclosure is not limited to a harvester, and could be incorporated into an agricultural device, such as a vessel (not shown) configured to contain or temporarily store grain therein, such as a silo. Additionally/alternately, the vessel (not shown) may be portable, for example, a wagon that may be pulled behind another device, such as a tractor, or configured for driven movement from a first location toward a second location, such as by a motorized grain wagon (not shown).

Figure 3:
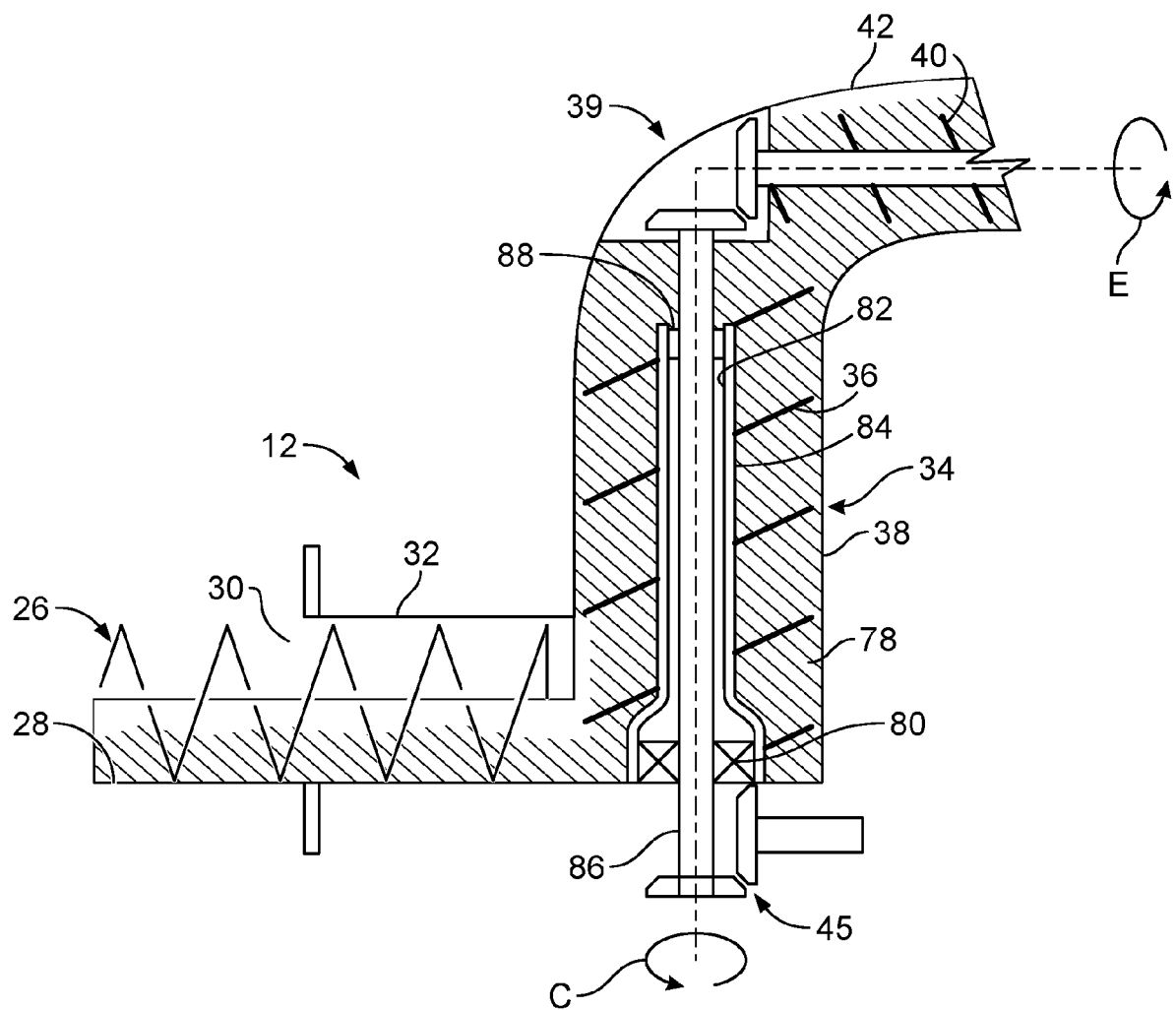
FIG. 3 is a simplified schematic representation of conveyors of the unloader of FIG. 1 shown in a first state containing settled grain.
Figure 4:
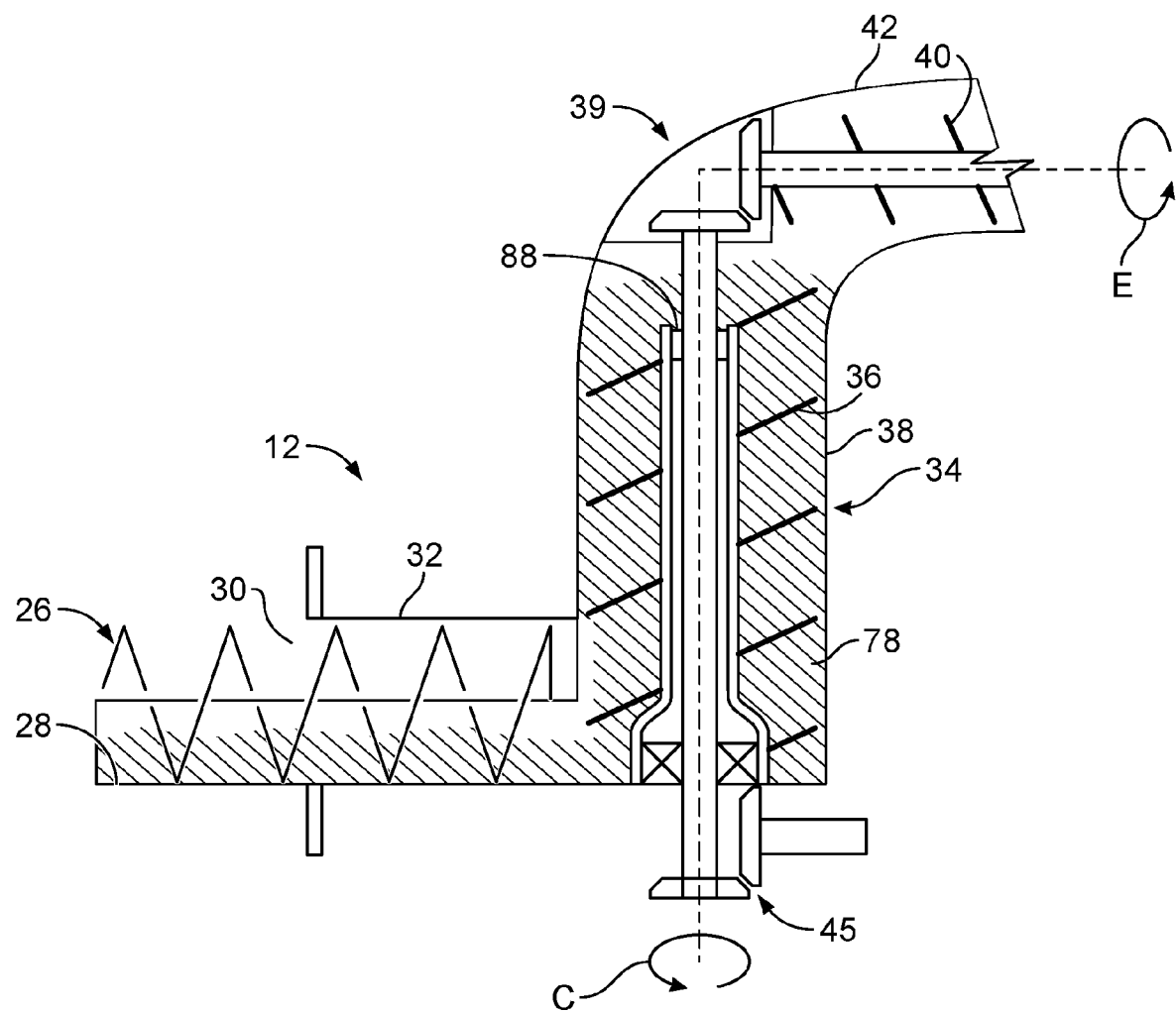
FIG. 4 is another simplified schematic representation of conveyors of the unloader of FIG. 1 shown in a second state wherein a portion of the settled grain has been conveyed away.

Referring also to FIGS. 2-4, main grain tank conveyor 26 is rotatable in a direction denoted by arrow B (FIGS. 2 and 3), for conveying the grain from conveyors 18 and 20 along trough 28 into an inlet opening 30 in an inlet end 32 of an unloader conveyor element or unloader conveyor 34 of unloader 12. Unloader conveyor 34 includes an elongate upwardly or generally vertically extending auger or conveyor or conveyor segment 36 supported for rotation as denoted by arrow C (FIGS. 3 and 4) in an upwardly extending tubular housing 38, and an elongate auger or conveyor or conveyor segment 40 oriented horizontally or at a small acute angle to horizontal, supported for rotation in an elongate tubular housing 42 connected to and forming a continuation of housing 38. Housing 42 and an upper portion of housing 38 are supported in cantilever relation by a lower portion of housing 38 for rotation relative thereto, as denoted by arrow D in FIG. 2, between an unloading position as shown, and a rearwardly extending stored position at about a 90 degree angle to the unloading position, in the well known manner. Auger or conveyor or conveyor segment 40 is connected to auger or conveyor or conveyor segment 36 for rotation thereby in a suitable manner, such as by bevel gears, a Hooke's joint, or the like, also in the well known manner. Auger or conveyor or conveyor segment 36 is connected in rotatably driven relation to an output of an unloader drive 44, which can include, for instance, a right angle gear drive 45 having an input pulley 46 connected in rotatably driven relation to a pulley 48 by a belt 50. Pulley 48 is connected to an output of an unloader drive clutch 52 having an input pulley 54 which is driven by a belt 56 which, in turn, is rotated by an output of an engine 58 (FIG. 1) of machine 10 or another rotatable power source, in the well known conventional manner. Unloader drive clutch 52 can be, for instance, a well known commercially available fluid or electrically actuated clutch controllable in the well known manner by a solenoid or the like (not shown). Here, unloader drive 44 additionally includes a second output rotatably drivingly connected to an input of a device 60 which includes an output pulley 62 connected by a belt 64 to a pulley 66 connected to grain tank conveyor 26. Device 60 is selectably operable for connecting drive 44 in rotatably driving relation to belt 64 for drivingly rotating grain tank conveyor 26. Device 60 can be, for instance, another well known commercially available fluid or electrically actuated clutch conventionally controllable by a solenoid or the like. As alternatives, it should be understood that it is contemplated that grain tank conveyor 26 and unloader conveyor 34 can be individually selectably driven, using one or more other drives, including, but not limited to, electric or fluid motors, or belt, chain and/or shaft drives or the like, as desired or required for a particular application, it only being required for the present control that conveyors 26 and 34 be individually or separately controllable.

Unloader 12 additionally includes an unloader controller 68 which can be, for instance, a well known commercially available processor based controller and/or a fluid based controller connected in operably controlling relation to clutch 52 and device 60, by, for instance, one or more conductive paths as represented by lines 70. Controller 68, in turn, can be operably connected to one or more input devices 72 in a suitable manner such as by one or more conductive paths represented by another line 70, for receiving inputs or input commands therefrom, also in the well known manner. As a non-limiting example, input device 72 can be a switch such as a momentary rocker switch movable to positions including an unloading position and a clean out position, a touch screen, or the like, located in an operator cab of machine 10 or elsewhere.

Generally, in operation, grain tank conveyors 18 and 20 will convey grain in grain tank 14 to main grain tank conveyor 26, which will convey the grain into inlet opening 30 in inlet end 32 of unloader conveyor 34. Operation of unloader conveyor 34 will convey the grain upwardly and through housings 38 and 42 as denoted by arrow E in FIG. 2 to an outlet or free end 74 thereof (FIG. 1) where the grain will be discharged from the conveyor through an outlet opening 76. The grain can be discharged into any receptacle such as a wagon or truck, or onto the ground or another surface or location (not shown), as desired.

Referring now particularly to FIG. 3, it has been observed that after use and cessation of operation of unloader conveyor 34, if not cleaned out, grain will remain in (especially with smaller grains) and/or have a tendency to slide downwardly between the flights of auger or conveyor or conveyor segment 36 and the inner surfaces of housings 38 and 42, so as to settle in the lower region or bottom of housing 38 of unloader conveyor 34, adjacent to or in the vicinity of inlet end 32 and inlet opening 30, as denoted by densely shaded region 78. Partial settling of grain is also shown between flights of auger or conveyor or conveyor segment 40 of housing 42 by shaded region 78. Grain will also be present in trough 28 of grain tank conveyor 26 as also denoted by shaded region 78. As a result, if grain tank conveyor 26 and unloader conveyor 34 are simultaneously started, or conveyor 26 is started before conveyor 34, it is possible that there will be insufficient space in the lower region of housing 38 for receiving grain conveyed thereto by conveyor 26, so as to result in compression and compaction of the grain sufficient to grind and crack and otherwise damage some or all of the grain in that region, which is undesirable. Additionally, if initiation of operation of both portions of conveyor 34 is simultaneous (especially for small grains, including, but not limited to rice or corn), relatively high startup torque and loads on unloader drive 44 can occur. Moreover, even if initiation of operation of only conveyors or conveyor segments 36 and 40 is simultaneous, the potential for damaging components of the drive, such as clutch 52, device 60, and belts 50, 56 and 64 is present. As a result, it is desirable to avoid such grain damage and potential damage to components due to elevated startup torque values and other related structural loading.

In operation, when an unload command or input is received, unloader controller 68 is operable for initiating operation of unloader conveyor 34. However, in an effort to overcome or at least mitigate the previously mentioned problems associated with grain compaction, one or more sensors (not shown) are utilized to sense or measure loading conditions associated with operating unloader conveyor 34 between an engaged mode or a disengaged mode. For example, sensors may include torque sensors or other type of sensor from which structural loading associated with start-up torque, such as associated with operating or rotating gear drive 45, which collectively drives the conveyor element in an engaged mode, i.e., both substantially vertical unloader conveyor or auger or conveyor segment 36 and substantially horizontal unloader conveyor or auger or conveyor segment 40 about their respective axes C, E. The torque value associated with operating unloader conveyor 34 ($T_{total}$) represents the sum of each of substantially vertical unloader conveyor or conveyor segment 36 ($T_{vertical}$) and substantially horizontal unloader conveyor or conveyor segment 40 ($T_{horizontal}$) as symbolized in Equation [1]:

$$(T_{total}) = (T_{vertical}) + (T_{horizontal}) \quad [1]$$

The torque values are related to structural elements. That is, ($T_{total}$) should be set to a value less than would be required to damage a structural component of the agricultural device. For example, ($T_{total}$) should correspond to a torque value that is less than the torque corresponding to a shear force capacity of a shear pin associated with rotatably driving gear drive 45. In cases where the start-up torque value, as sensed by the torque sensor, associated with rotatably driving gear drive 45 exceeds ($T_{total}$), controller 68 can disengage, or place in a disengaged mode, a drive clutch 80 such as positioned between an inside surface of a tube 84 to which are attached the flights of substantially vertical unloader conveyor or auger or conveyor segment 36 and a shaft 86 extending at its ends to form mating parts of respective gear drive 45 at one end of shaft 86 and bevel gear 39 at the other end of shaft 86. In one embodiment, a bushing 88 is positioned between tube 84 and shaft 86 to substantially prevent grain from encountering inside surface 82 of tube 84, as well as to more smoothly guide rotational movement of substantially vertical unloader conveyor or auger or conveyor segment 36 about shaft 86.

In response to disengaging clutch 80 between tube 84 and shaft 86 of substantially vertical unloader conveyor or auger or conveyor segment 36, shaft 86 may freely rotate with respect to tube 84 (i.e., ($T_{vertical}$) approaches zero), thereby reducing that component of the start-up torque associated with rotating unloader conveyer 34. That is, only substantially horizontal unloader conveyor or auger or conveyor segment 40 rotates ($T_{horizontal}$), permitting grain in housing 42 to be removed. As further shown in FIG. 4, upon removal of most or all of the grain from housing 42, the value of ($T_{horizontal}$) should be reduced. Upon reduction of ($T_{horizontal}$), such as sensed and controlled by controller 68, clutch 80 may be reengaged such that tube 84 and shaft 86 turn together, rotatably driving substantially vertical unloader conveyor or auger or conveyor segment 36, ($T_{vertical}$), thereby removing grain from upwardly extending tube housing 38.

Figure 5:
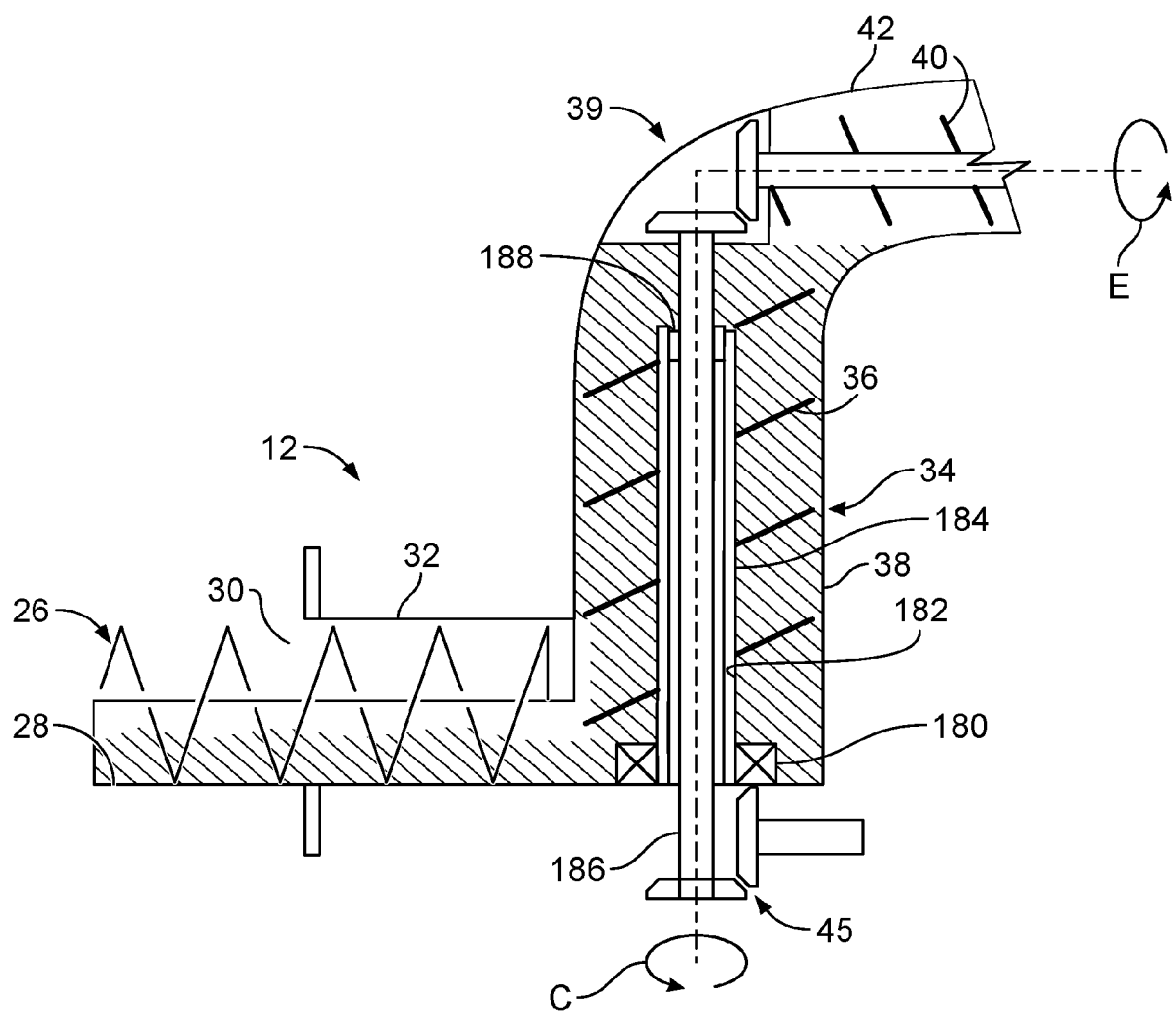
FIG. 5 is a simplified schematic representation of conveyors of an alternate embodiment of an unloader shown in a first state containing settled grain.
Figure 6:
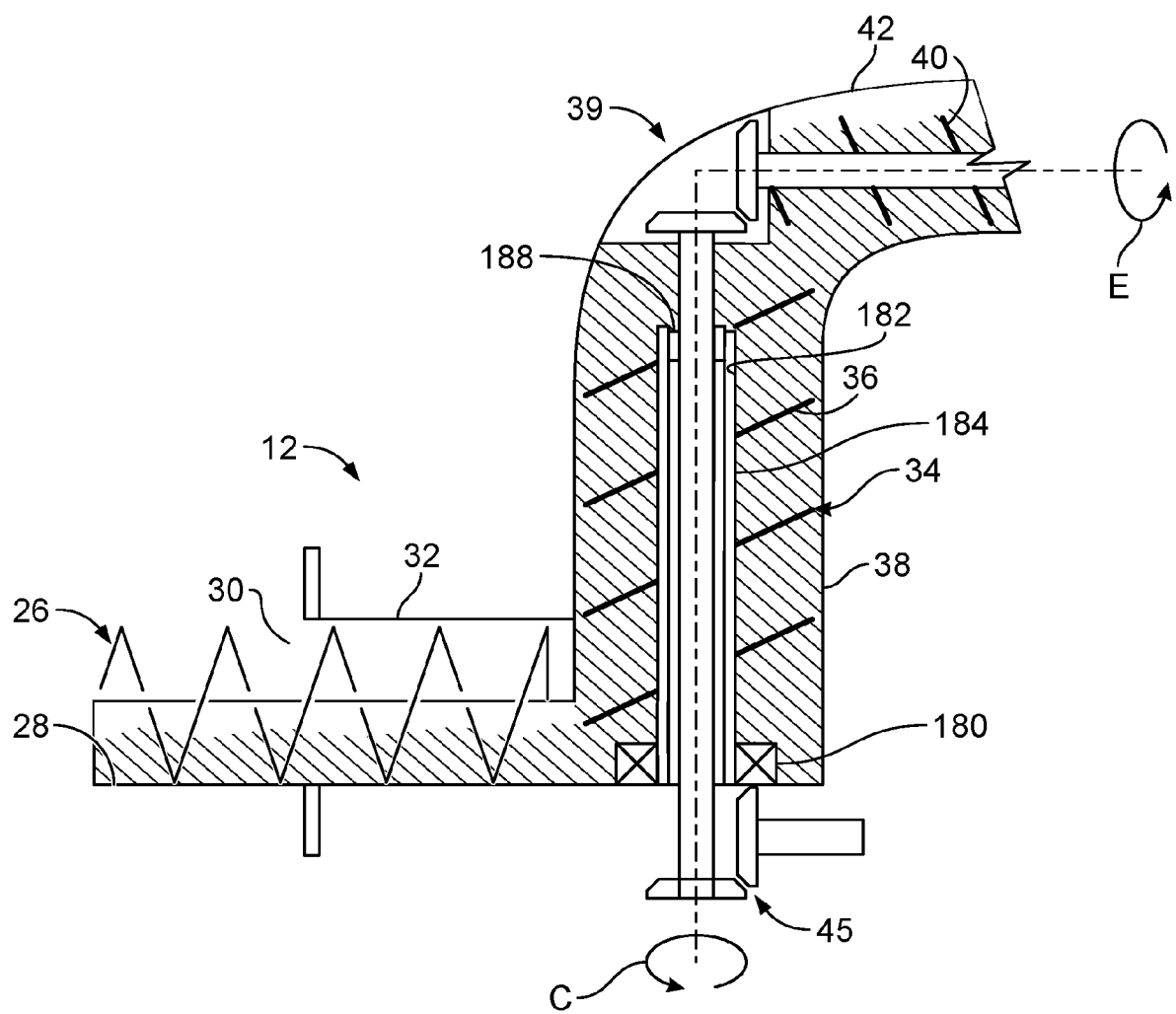
FIG. 6 is another simplified schematic representation of conveyors of an unloader shown in a second state wherein a portion of the settled grain has been conveyed away.

In an alternate embodiment, as shown in FIGS. 5-6, clutch 180 is similar to clutch 80, except that drive clutch 180 is positioned between an outside surface of a tube 184 to which are attached the flights of substantially vertical unloader conveyor or auger or conveyor segment 36 and a shaft 186 extending at its ends to form mating parts of respective gear drive 45 at one end of shaft 86 and bevel gear 39 at the other end of shaft 86. In one embodiment, a bushing 188 is positioned between tube 184 and shaft 186 to substantially prevent grain from encountering the inside surface of tube 184, as well as to more smoothly guide rotational movement of substantially vertical unloader conveyor or auger or conveyor segment 36 about shaft 186.

It is to be understood that while substantially vertical unloader conveyor or auger or conveyor segment 36 and substantially horizontal unloader conveyor or auger or conveyor segment 40 represent exemplary embodiments, that each conveyor segment 36, 40 are not intended to be so limiting. That is, substantially vertical, as in substantially vertical unloader conveyor or auger or conveyor segment 36 can deviate from a vertical axis by up to about 30 degrees, and that substantially horizontal, as in substantially horizontal unloader conveyor or auger or conveyor segment 40 can deviate from a horizontal axis by up to about 30 degrees.

It is to be understood that a kit may be provided to retrofit an existing agricultural device to include the novel functionality permitting selectable control of the operating unloader conveyor, and more specifically, including the capability to selectably control the conveyor segments. That is, the kit comprises a substantially vertical unloader conveyor or auger or conveyor segment similar to conveyor segment 36, which would also include a geared shaft, such as shaft 86 having ends that would engage existing drives and/or gears, as well as a clutch, sensors (load measuring device) and a compatible connection to an existing controller (or a controller if none existed in the original or unmodified agricultural device) to permit mechanical/electrical installation of the kit components in the agricultural device.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An agricultural device for controlled unloading of grain comprising:
    an unloader conveyor including an enclosed housing having an inlet end including an opening for receiving grain, and an opposite outlet end including a discharge opening through which the grain can be discharged;
    an unloader conveyor element extending through the housing between the ends and operable for conveying the grain through the housing from the inlet end and discharging the grain through the discharge opening, the unloader conveyor element having a substantially vertical unloader conveyor segment connected to a substantially horizontal unloader conveyor segment downstream of the substantially vertical unloader conveyor segment;
    an unloader drive operably controllable for selectably operating the conveyor element between an engaged mode and a disengaged mode, including selectably operating a portion of the conveyor element connected to the substantially vertical unloader conveyor segment in a disengaged mode in response to a sensed cumulative loading condition of the substantially vertical unloader conveyor segment and the substantially horizontal unloader conveyor segment exceeding a predetermined value,
    a sensor that senses cumulative loading to initiate operation of a clutch based on a comparison of the sensed cumulative loading with the predetermined value; and
    the clutch initiates one of the engaged mode and the disengaged mode based on the comparison.

2. The agricultural device of claim 1, wherein the predetermined value is a predetermined torque value of the substantially vertical unloader conveyor segment and the substantially horizontal unloader conveyor segment in the engaged mode.

3. The agricultural device of claim 2, wherein the predetermined torque value is less than a shear force capacity of the substantially vertical unloader conveyor segment and the substantially horizontal unloader conveyor segment in the engaged mode.

4. The agricultural device of claim 2, wherein simultaneous operation of the substantially vertical unloader segment and the substantially horizontal unloader conveyor segment in the engaged mode involves simultaneous rotation of the substantially vertical unloader conveyor segment and the substantially horizontal unloader conveyor segment about respective axes.

5. The agricultural device of claim 1, wherein the agricultural device is a harvesting device.

6. The agricultural device of claim 1, wherein the agricultural device is a combine.

7. The agricultural device of claim 1, wherein the agricultural device is a vessel configured to contain grain therein.

8. The agricultural device of claim 7, wherein the vessel is portable.

9. The agricultural device of claim 7, wherein the vessel is a configured for driven movement between a first location toward a second location.

10. A kit for an agricultural device for controlled unloading of grain including an unloader conveyor, the agricultural device including an enclosed housing having an inlet end including an opening for receiving grain, and an opposite outlet end including a discharge opening through which the grain can be discharged, the agricultural device further having an unloader conveyor element extending through the housing between the ends and operable for conveying the grain through the housing from the inlet end and discharging the grain through the discharge opening, the unloader conveyor element having a first substantially vertical unloader conveyor segment connected to a substantially horizontal unloader conveyor segment downstream of the substantially vertical unloader conveyor segment, the kit comprising:
    a second substantially vertical unloader conveyer segment configured to replace the first substantially vertical unloader conveyor segment of the unloader conveyor element;
    a load sensing device that senses a cumulative loading for initiating operation of a clutch based on a comparison of the cumulative loading to a predetermined value;
    an unloader drive operably controllable for selectably operating the conveyor element between an engaged mode and a disengaged mode in response to a loading condition sensed by the load sensing device, the unloader drive selectably operating a portion of the conveyor element of the second substantially vertical unloader conveyor segment in a disengaged mode in response to a sensed cumulative loading condition of the second substantially vertical unloader conveyor segment and the substantially horizontal unloader conveyor segment exceeding a predetermined value; and the clutch attachable to the second substantially vertical conveyor, the clutch initiates one of the engaged mode and the disengaged mode based on load sensed by the load sensing device.

11. The kit of claim 10, wherein the load sensing device is a torque sensing device.

12. The kit of claim 10, wherein the sensed cumulative loading condition is a predetermined torque value of the second substantially vertical unloader conveyor segment and the substantially horizontal unloader conveyor segment in the engaged mode.

13. The kit of claim 12, wherein the predetermined torque value is less than a shear force capacity of the second substantially vertical unloader conveyor segment and the substantially horizontal unloader conveyor segment in the engaged mode.

14. An agricultural device that controls unloading of grain comprising:
 an unloader conveyor including an enclosed housing having an inlet end including an opening for receiving grain, and an opposite outlet end including a discharge opening through which the grain can be discharged;
 an unloader conveyor element extending through the housing between the ends and operable for conveying the grain through the housing from the inlet end and discharging the grain through the discharge opening, the unloader conveyor element having a substantially vertical unloader conveyor segment connected to a substantially horizontal unloader conveyor segment downstream of the substantially vertical unloader conveyor segment;
 an unloader drive operably controllable for selectably operating the conveyor element between an engaged mode and a disengaged mode, including selectably operating a portion of the conveyor element of the substantially vertical unloader conveyor segment in a disengaged mode in response to a cumulative loading condition of the substantially vertical unloader conveyor segment and the substantially horizontal unloader conveyor segment exceeding a predetermined torque value; and
 a sensor that senses a cumulative loading for initiating operation of a clutch based on a comparison with a predetermined loading value; and
 a clutch attachable to the substantially vertical unloader, the clutch initiates one of the engaged mode and the disengaged mode based on the cumulative loading sensed by the sensor.

15. The agricultural device of claim 14, wherein the predetermined torque value is less than a shear force capacity of the substantially vertical unloader conveyor segment and the substantially horizontal unloader conveyor segment in the engaged mode.

16. The agricultural device of claim 14, wherein simultaneous operation of the substantially vertical unloader segment and the substantially horizontal unloader conveyor segment in the engaged mode involves simultaneous rotation of the substantially vertical unloader conveyor segment and the substantially horizontal unloader conveyor segment about respective axes.

17. The agricultural device of claim 14, wherein the agricultural device is a harvesting device.

18. The agricultural device of claim 14, wherein the agricultural device is a combine.

19. The agricultural device of claim 14, wherein the agricultural device is a vessel configured to contain grain therein.

20. The agricultural device of claim 19, wherein the vessel is portable.

* * * * *